(12) United States Patent
Fjelldal (10) Patent No.: US 11,730,985 B2
(45) Date of Patent: Aug. 22, 2023

(54) ENERGY-ABSORBING STRUCTURE FOR A TETHER LINE, AND A TETHER LINE INCORPORATING THE SAME

(71) Applicant: Alf Kristian Fjelldal, Trondheim (NO)

(72) Inventor: Alf Kristian Fjelldal, Trondheim (NO)

( * ) Notice: Subject to any disclaimer, the term of this patent is extended or adjusted under 35 U.S.C. 154(b) by 475 days.

(21) Appl. No.: 16/644,141

(22) PCT Filed: Sep. 4, 2018

(86) PCT No.: PCT/EP2018/073774
§ 371 (c)(1),
(2) Date: Mar. 3, 2020

(87) PCT Pub. No.: WO2019/043265
PCT Pub. Date: Mar. 7, 2019

(65) Prior Publication Data
US 2020/0406074 A1 Dec. 31, 2020

(30) Foreign Application Priority Data

Sep. 4, 2017 (GB) ...................................... 1714170

(51) Int. Cl.
*A62B 35/04* (2006.01)
*A62B 35/00* (2006.01)
(Continued)

(52) U.S. Cl.
CPC .......... *A62B 35/04* (2013.01); *A62B 35/0043* (2013.01); *F16F 1/125* (2013.01); *F16G 11/04* (2013.01)

(58) Field of Classification Search
CPC ...... A62B 35/04; A62B 35/0043; F16F 1/125; F16G 11/04
See application file for complete search history.

(56) References Cited

U.S. PATENT DOCUMENTS

| 756,175 | A | * | 3/1904 | Meisselbach et al. ... | G01G 3/02 267/74 |
| 1,428,740 | A | * | 9/1922 | Akimoff .................. | F16F 1/125 267/286 |

(Continued)

FOREIGN PATENT DOCUMENTS

| CH | 336 633 A | 2/1959 |
| DE | 1233214 B | 1/1967 |

(Continued)

OTHER PUBLICATIONS

International Preliminary Report on Patentability corresponding Application No. PCT/EP2018/073774, dated Mar. 19, 2020.

(Continued)

*Primary Examiner* — Anita M King
(74) *Attorney, Agent, or Firm* — Renner, Otto, Boisselle & Sklar, LLP (57) ABSTRACT

An energy-absorbing structure for a tether line includes a helical spring and a first connector for securing a first end of the helical spring to a first fastener (such as a support cable section, an eye bolt or an eye nut). The first connector has an externally threaded portion for threadedly receiving the first end of the helical spring. A sleeve is provided on the connector, extending over at least part of the first end of the helical spring and the external threaded portion of the connector, for retaining the helical spring on the connector. Additionally or alternatively, the connector includes a tapered portion extending from the inner end of the externally threaded portion.

16 Claims, 8 Drawing Sheets

(51) Int. Cl.
*F16F 1/12* (2006.01)
*F16G 11/04* (2006.01)

(56) References Cited

U.S. PATENT DOCUMENTS

| | | | | |
|---|---|---|---|---|
| 5,482,258 A * | 1/1996 | Clauson | ............... | F16F 7/00 |
| | | | | 267/71 |
| 6,375,171 B1 * | 4/2002 | Zimmermann | ....... | F16F 15/067 |
| | | | | 267/179 |
| 7,270,320 B2 * | 9/2007 | Menzel | ............... | B27B 17/0033 |
| | | | | 267/179 |
| 7,530,334 B1 * | 5/2009 | Napolitano | ........... | A01K 27/005 |
| | | | | 119/769 |
| 9,689,451 B2 * | 6/2017 | Pepka | ..................... | F16F 1/125 |
| 9,944,144 B2 * | 4/2018 | Pepka | ..................... | B60G 15/04 |
| 10,352,387 B2 * | 7/2019 | Dietzel | ..................... | E05F 1/10 |
| 10,413,762 B2 * | 9/2019 | Patton | ............... | A62B 35/0037 |
| 2002/0104665 A1 | 8/2002 | Wolf | | |
| 2004/0168735 A1 | 9/2004 | Bauder | | |
| 2009/0300863 A1 | 12/2009 | Bartucciotto | | |
| 2011/0204550 A1 | 8/2011 | Pepka | | |
| 2017/0241500 A1 * | 8/2017 | Pepka | ....................... | F16F 3/04 |

FOREIGN PATENT DOCUMENTS

| | | |
|---|---|---|
| EP | 0678603 A1 | 10/1995 |
| JP | 3-854873 B2 | 12/2006 |
| WO | 98/10204 A1 | 3/1998 |
| WO | 03/046431 A1 | 6/2003 |
| WO | 2005/030335 A1 | 4/2005 |

OTHER PUBLICATIONS

International Search Report and Written Opinion for corresponding Application No. PCT/EP2018/073774, dated Dec. 19, 2018.
GB Search Report for corresponding Application No. 1714170.6, dated Jan. 24, 2018.

* cited by examiner

ENERGY-ABSORBING STRUCTURE FOR A TETHER LINE, AND A TETHER LINE INCORPORATING THE SAME

TECHNICAL FIELD

This invention relates to a tether line, or "fall arrest line", for use with an object that is mounted at height on a support structure and so constitutes a potential "dropped object", and to an energy-absorbing structure for such a line. If the primary mounting of the object onto the structure should fail and the object start to drop under the action of gravity, the object will remain connected to the support structure by the tether line, and the tether line will restrict the distance through which the object is able to fall. The invention may also be applied to a tether line that serves to restrain a person if they should fall while working at height.

BACKGROUND

A tether line may be used, for example, in almost any situation where objects are mounted at height. For example an oil or gas platform typically has a large number of components (such as, for example, lights) mounted at height on the basic platform structure. If the mounting of one of these components should fail, for example through the effects of corrosion or as a result of the object being struck by another, moving object, the object will fall and can potentially cause serious injury and damage. A tether line may therefore be used to provide a secondary attachment between a component and the structure on which it is mounted so that, if the primary mounting of the component should fail and the component drops, its fall will be restricted by the tether line. This reduces the injury and damage that is likely to result from the failure of the component's primary mounting. For example, is it known to secure a potential dropped object to its supporting structure with a wire rope, to restrict its drop. This has been common for objects up to about 40-50 kg. Also, when tools are used at height it is known to secure the tools to a structure using a lanyard, and this again serves to restrain the fall if a tool is dropped. Such known lanyards are typically able to be used with tools of up to 2 or 3 kg in mass.

SUMMARY

An aspect of the present invention provides an energy-absorbing structure for a tether line (or fall arrest line), the energy-absorbing structure comprising: a helical spring; a first connector for securing a first end of the helical spring to a first fastener, the connector having an externally threaded portion for threadedly receiving the first end of the helical spring; and a sleeve provided on the connector and extending over at least part of the first end of the helical spring and the external threaded portion of the connector for retaining the helical spring on the connector.

An another aspect of the present invention provides an energy-absorbing structure for a tether line (or fall arrest line), the energy-absorbing structure comprising: a helical spring; and a first connector for securing a first end of the helical spring to a first fastener, the connector having an externally threaded portion for threadedly receiving the first end of the helical spring; wherein the connector further comprises a tapered portion extending from the inner end of the externally threaded portion.

By "inner end" is meant that end which is screwed into the helical spring. If the spring should experience a turning moment that would cause the spring to start to unscrew from the connector, the spring would not be able to grip on the end face of the connector.

Providing an energy-absorbing structure of the invention within a tether line reduces the maximum loading that the tether line is subject to. For example, in tests using a component with a mass of 300 kg and a drop of 1 m the maximum loading in a tether line of the present invention was measured (using a load cell) to be around 700-800 kgf, whereas the maximum loading if a conventional wire rope tether line had been used was calculated to be approximately 30 tons (it could not be measured directly as it exceeded the capacity of the available load cell). Furthermore, providing the energy-absorbing structure as a separate component to the support cable section means that the properties (eg, thickness, composition) of the support cable sections need not be influenced in any way by the provision of the energy-absorbing structure.

Conventionally a tether line is made of, for example, wire rope or a similar material. The maximum component mass that a particular tether line can be used with is determined by, among other factors, the cross-sectional area of the wire rope (and so by its diameter in the case of a wire rope with a generally circular cross-section). Accordingly the support cables in a tether line of the invention can, for a given component mass, have a much smaller cross-section than a conventional wire rope tether line, since a tether line of the invention is subject to lower forces than a conventional tether line. In the example above of a component with a mass of 300 kg, a conventional tether line would typically need to be made of wire rope with a diameter of 24 mm or greater, whereas the support cable sections of a tether line of the invention need only have a diameter of around 8 mm for a 300 kg component. A tether line of the invention is therefore much easier to handle and manoeuvre, since an 8 mm diameter wire rope is much more flexible, and much lighter per unit length, than a 24 mm diameter wire rope.

In addition, a tether line incorporating an energy-absorbing structure of the invention has been found to restrain motion of a falling object more effectively than a conventional tether line. With a conventional tether line an object may swing unpredictably once its fall has initially been arrested by the tether line going taut and may even rebound in a manner similar to a "yo-yo", but this does not happen when a tether line incorporating an energy-absorbing structure of the invention is used.

In an energy-absorbing structure of the first or second aspect, the connector provides a simple, yet reliable and robust connection between the helical spring and a fastener (such as a support cable section, an eye-bolt or an eye-nut). The conventional way of joining a helical spring to another component is to wind the end of the spring wire into a loop directed along the spring axis and fasten another component to this wound end. However, it has been found that such a conventional wound end cannot withstand large forces.

An energy-absorbing structure of the first aspect may further comprise a tapered portion extending from the inner end of the externally threaded portion. By "inner end" is meant that end which is screwed into the helical spring. If the spring should experience a turning moment that would cause the spring to start to unscrew from the connector, the spring would not be able to grip on the end face of the connector.

An energy-absorbing structure of the second aspect may further comprises a sleeve provided on the connector and extending over at least part of the first end of the helical spring and the external threaded portion of the connector for retaining the helical spring on the connector.

Further optional features of an energy-absorbing structure of the first or second aspect are set out in the dependent claims.

An energy-absorbing structure of the first or second aspect may further comprise a second connector for securing a second end of the helical spring to a second fastener, such as a second support cable section, eye-bolt or eye-nut. Such second connector is preferably also a connector of a type described herein (although it is not necessary that the first and second connectors are exactly identical to one another).

Further aspects of the invention provide a tether line comprising an energy-absorbing structure of the first or second aspect and a fall arrest line comprising an energy-absorbing structure of the first or second aspect. Such a tether line or fall arrest line may comprise support cable sections secured to each end of the energy-absorbing structure, as described in more detail below. Alternatively such a tether line or fall arrest line may comprise a support cable section secured to one end of the energy-absorbing structure and a shackle or another connector secured to another end of the energy-absorbing structure.

A further aspect provides a connector, for use in a tether line, for securing a first end of a helical spring to a fastener such as a support cable section or an eye bolt or eye nut. The connector has an externally threaded portion for threadedly receiving the first end of the helical spring, and a sleeve extending over at least part of the external threaded surface of the connector. When an end of a helical spring is screwed onto the external threaded surface of the connector, the sleeve extends over at least part of the portion of the helical spring screwed onto the external threaded surface, for retaining the helical spring on the external threaded surface.

A further aspect provides a connector, for use in a tether line, for securing a first end of a helical spring to a fastener such as a support cable section or an eye bolt or eye nut. The connector has a tapered portion extending from the inner end of the externally threaded portion. (By "inner end" is meant that end which is screwed into the helical spring.)

Further optional features of an energy-absorbing structure of the first or second aspect are set out in the dependent claims. These optional features may also be provided in a connector according to one of the above aspects.

BRIEF DESCRIPTION OF THE DRAWINGS

Preferred embodiments of the invention will now be described by way of illustrative example with reference to the accompanying figures, in which.

DETAILED DESCRIPTION OF THE EMBODIMENTS

Embodiments of the invention will be described with reference to restraining a potential dropped "object". However, the invention may also be applied in a tether line for restraining a falling person (such lines are often also known as a "fall arrest line").

Figures 1, 2:
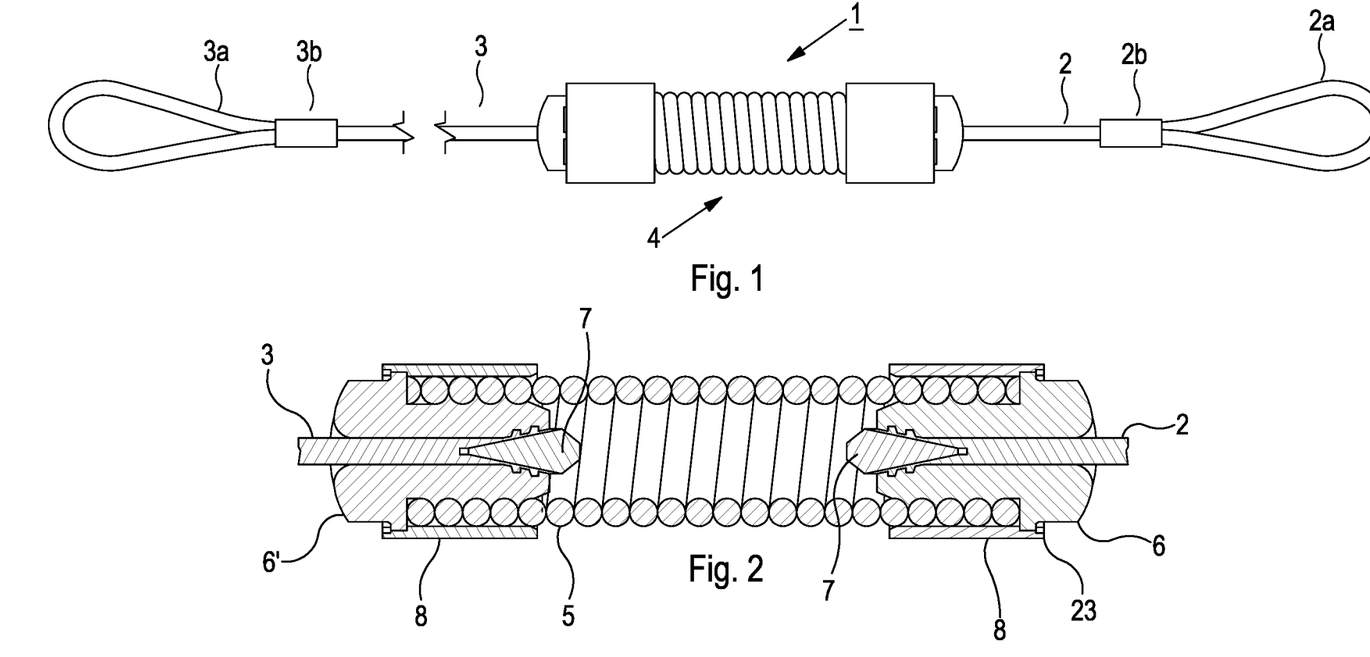
FIG. 1 is a schematic overall view of a tether line incorporating an energy-absorbing structure according to an embodiment of the present invention.
FIG. 2 is a partial sectional view of the tether line of FIG. 1.

FIG. 1 is a schematic overall view of a tether line 1 that includes an energy-absorbing structure according to an embodiment of the present invention. The tether line 1 comprises two sections 2, 3 of support cable and an energy-absorbing structure 4. The first section 2 of support cable, the energy-absorbing structure 4 and the second section 3 of support cable are arranged generally in-line with one another, in that order. In use, one section 3 of support cable may be attached to an object mounted at height on a support structure, and the other section 2 of support cable is attached to a the support structure (such as an oil or gas platform), so that the tether line is connected between the object and the support structure and can restrain the object in the event of a fall. To facilitate this the end portion 2a, 3a of each section of support cable may be looped back on itself and secured to the support cable, for example using a crimp or swaged fastener 2b, 3b, to provide a loop that allows the section support cable to be easily attached to the object or support structure. For example, the looped end portion 2a, 3a may be connected to the object or support structure using a conventional lifting shackle. Suitable shackles include those supplied by Gunnebo Industries, further details of which are available at: http://www.gunneboindustries.com/Lifting/Products/Shackles/GL-Shackles/Gunnebo-Lifting-Standard-Shackles-No-855/.

However, the invention is not limited to this, and the ends of the support cable sections 2, 3 may be terminated in any suitable manner to allow for attachment to an object or a support structure. Possible examples of other terminations of the support cable sections 2, 3 include, but are not limited to, a spliced eye or thimble, a swaged open socket, a swaged closed socket, a wire rope grip secured to the support cable section, etc.

FIG. 2 is a cross-sectional view through the energy-absorbing structure 4 of the tether line 1 of FIG. 1. In this embodiment the energy-absorbing structure comprises a helical spring 5 (or "coil spring"), a first connector 6 for securing a first end of the helical spring to a first fastener (in this example the first section of support cable 2) and a second connector 6' for securing a second end of the helical spring to a second fastener (in this example the second section of support cable 3). In use, if an object that is restrained by the tether line should fall, once the object has fallen a length equal to the overall length of the tether line, the spring 5 will start to extend and thereby restrain the fall of the object. As noted above, this may significantly reduce the maximum loading experienced by the tether line, in the above example of a 300 kg object dropping through 1 m from several tonnes to around 700 kgf. The support cable sections of a tether line of the invention may therefore have a significantly smaller diameter than would be necessary for a conventional wire rope tether line. Furthermore, the large forces experienced when a conventional wire rope tether line restrains a dropped object are likely to damage the anchor point where the tether line is connected to the supporting structure and/or damage the object itself—and the lower forces generated by a tether line of the invention are much less likely to cause damage to the anchor point or to the object.

In principle other energy-absorbing components could be used rather than a helical spring, such as a generally cylindrical piece of an elastic material. However, a helical spring is generally preferred since it provides a robust and simple energy-absorbing component that can withstand the large forces generated in restraining a dropped object. In addition, in the oil & gas industry is it forbidden to use polymer products for load carrying uses.

The spring may be covered to provide additional protections against the environment, for example using a "heat shrink" plastic covering.

The support cable sections 2, 3 may be made of any suitable material such as, for example, wire rope. In a version intended for use with objects having a mass of up to 100 kg, a wire rope of diameter 4 mm has been found suitable, and for a version intended for use with objects having mass up to 300 kg a wire rope of diameter of 8 mm has been found suitable.

The dimensions of the helical spring 5 will again depend on the designed working load of the tether line. In the version for use with objects up to 100 kg mentioned above, a helical spring having approximately 20 turns of a stainless steel wire having a diameter of around 6 mm, and having an inner helix diameter of around 32 mm was found to be suitable. Examples of suitable dimensions of the helical spring 5 for other maximum working loads are:

200 kg load: 20 turns; wire diameter—8 mm; helix inner diameter—32 mm 300 kg load: 20 turns; wire diameter—10 mm; helix inner diameter—32 mm It is important that, when the tether line is used, the spring 5 remains attached to the support cable sections 2,3. FIG. 2 illustrates one preferred method of attaching the spring 5 to the support cable sections 2,3. In this embodiment, as noted, each end of the spring is connected to a respective support cable section using a connector 6, 6', which will be referred to as a "plug", described in more detail below. The following description assumes that the connectors 6, 6' are identical to one another and so refers just to a "connector 6", but the invention does not require that the two connectors are identical to one another.

A connector or plug 6 has an externally threaded portion for threadedly receiving the first end of the helical spring, and this is described in more detail below. A plug 6 has a central bore 9 through which the support cable section 2,3 can pass, and the support cable is secured at the inner end of the plug. In the embodiment of FIG. 2 an insert member 7 is used to attach the support cable section 2,3 to the plug 6, and this is also described in more detail below.

In a preferred embodiment a sleeve or cap 8 is provided around the cap 6, such that the spring 5 is between the sleeve/cap 8 and the plug 6, to further reduce the risk of the spring becoming detached from the plug 6. Again, the cap 8 is described in more detail below.

Figure 4:
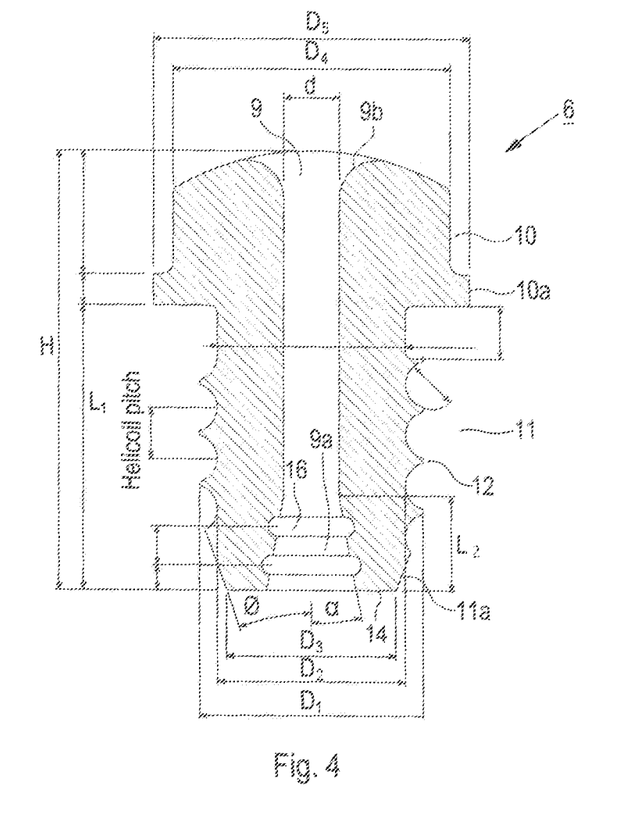
FIG. 4 is an enlarged sectional view of a connector of the energy-absorbing structure of FIG. 1, 2 or 3.

FIG. 4 is a cross-sectional view through one embodiment of a plug 6 for use in the present invention. As shown, the plug 6 has a head 10, and a body 11 extending from the head. An internal bore 9 for receiving the support cable section 2,3 runs through the plug 6, generally along the axis of the plug 6. The body portion 11 of the plug is provided with an external screw thread 12, that is dimensioned to allow the spring 5 to be screwed onto the body portion 11 of the plug. Preferably, the sense of the screw thread is arranged such that the spring 5 is screwed onto the plug 6 by rotating the spring (relative to the plug) in the sense that causes the coils of the spring to open. This means that unscrewing the spring from the cap would require turning the spring in the sense that causes the spring to close up, and this also serves to minimise the risk of the spring accidently becoming detached from the plug.

The end portion 11a of the body 11 furthest from the head 10 of the plug is preferably tapered inwards as shown in FIG. 4. This means that if the spring should experience a turning moment that would cause the spring to start to unscrew from the plug, the spring should not be able to grip on the end face 14 of the plug (which could assist the spring in becoming unscrewed from the plug). Providing the tapered end portion 11a therefore again further reduces the likelihood that the spring will become detached from the plug in use.

Figure 5A:
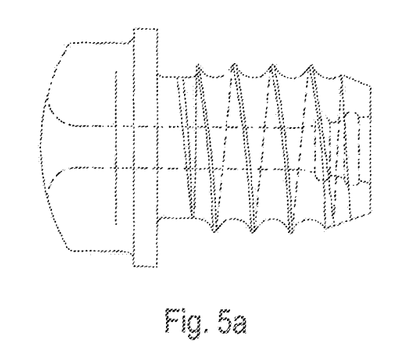
FIGS. 5(a) and 5(b) are side views of the connector of FIG. 4.
Figure 5B:
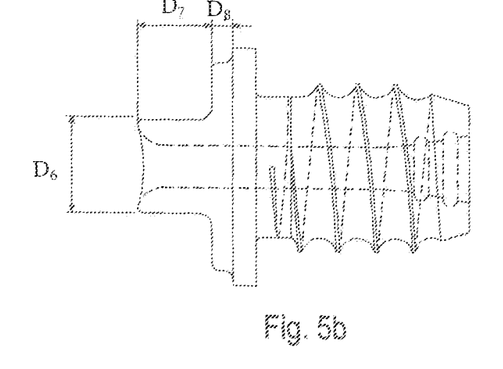

To assist in assembly, the head 10 of the plug may be configured to allow a user to easily grip the head 10 while screwing the spring 5 onto the plug. In the embodiment of FIGS. 5(a) and 5(b) the head of the plug is provided with two opposing flat surfaces 14 to allow the head to be gripped easily, but other configurations may be used. In an example of the plug of FIG. 5(b) the dimensions $D_6$, $D_7$ and $D_8$ may be 20 mm, 16 mm and 4 mm respectively.

It is preferable that a sharp edge does not exist where the bore 9 terminates in the head of the plug, since there would be a risk of the support cable section rubbing against the edge, and thereby becoming buckled and/or damaged. In the embodiment of FIG. 4 therefore, the diameter of the bore 9 preferably increases at the end of the bore at the head of the plug so as to provide a rounded edge 9b that will not cause damage to the support cable section.

The support cable section 2,3 may be attached to the plug 6 in any suitable way. One preferred method is shown in FIG. 2, in which a retainer member 7 (or "wedge") having a tapered portion 7a is driven into the end of the support cable, so that the support cable section is anchored in the bore 9 by the retainer member 7. The cross-section of the retainer member may be complementary to the cross-section of the bore 9 in the plug—for example the bore and the retainer member may both have a circular cross section (in which case the tapered portion 7a of the retainer member is generally conical).

Figure 6:
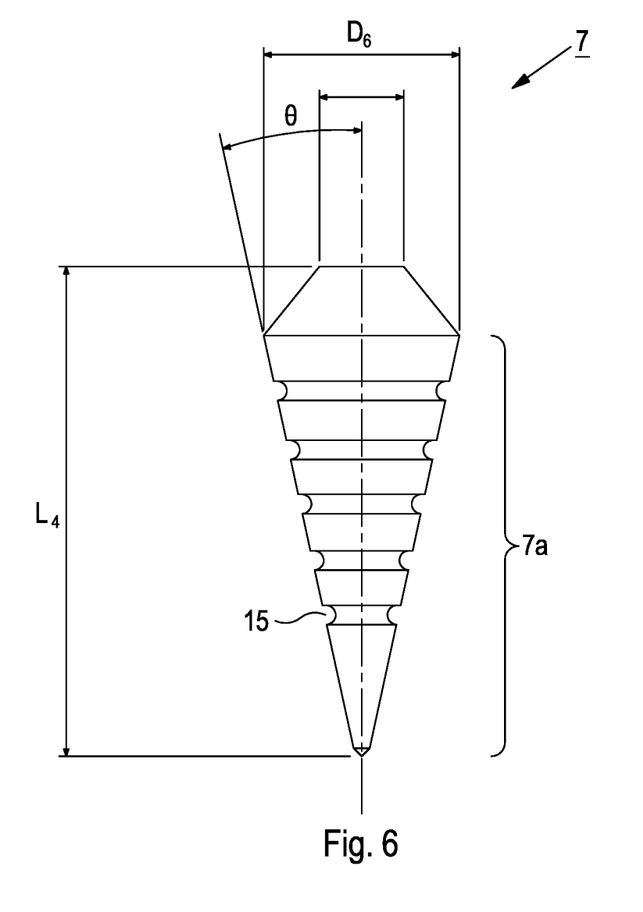
FIG. 6 is a side view of a wedge of the energy-absorbing structure of FIG. 1, 2 or 3.

The retainer member/wedge 7 is shown in more detail in FIG. 6 and, as shown there, the wedge 7 has a generally tapered body to assist in driving the wedge into the support cable. The portion 9a of the bore into which the wedge is driven is preferably provided with a taper that is generally complementary to the taper angle of the tapered portion 7a of the wedge. Moreover, the taper angle of the bore may be slightly less than the taper angle of the wedge so that the cross-sectional area of the annular gap between the wedge and the bore remains approximately constant along the length of the tapered portion 9a of the bore. This makes it possible for the same cross-sectional area of the support cable section (eg wire rope) to be held between the wedge and the bore along the length of the tapered portion 9a of the bore. In one example, the taper angle α of the bore may be 10° and the taper angle θ of the wedge may be 12°.

The wedge 7 is preferably secured in place to ensure secure attachment of the support cable section to the plug 6. The wedge may for example be secured in position using an adhesive; one suitable adhesive is the adhesive Wirelock™ from the Millfield Group (http://www.millfield-group.co.uk/millfield-wirelock/about/).

To further ensure secure attachment of the support cable section to the plug 6, as shown in FIG. 6 one or more grooves or recesses, in this example one or more annular grooves 15 may be provided in the exterior surface of the tapered portion 7a of the wedge. Additionally or alternatively, one or more grooves or recesses, in this example one or more annular grooves 16 may be preferably provided in the part 9a of the bore 9 that receives the wedge. When a support cable section is inserted into the bore 9, and the wedge 7 is then driven into the support cable section and adhesive is applied, the grooves will prevent the support cable section and wedge moving out of position during installation and/or use of the energy-absorbing structure in a tether line.

In an example of the tether line suitable for use with components having a mass up to 200 kg, the overall height H of the plug is 70 mm, with the overall length $L_1$ of the body portion 11 being 45 mm. The diameter $D_1$ of the body portion over the threads 12 was 36 mm with the threads having a depth of 3 mm. The tapered portion 11a of the body had a length $L_2$ of approximately 10 mm and a half-angle ø of taper of 20°, and the diameter $D_2$ of the end face was 27 mm. The parallel portion of the bore 9 had a diameter d of 9 mm, and the tapered portion 9a of the bore tapered at a half angle of 10° over a length of approximately 15 mm. A wedge for use with this plug had an overall length $L_4$ of 35 mm, with the tapered portion of the wedge having a length of 30 mm. The maximum diameter $D_6$ of the wedge was 14 mm, and the tapered portion 7a had a half angle θ of taper of 12°. The wedge is provided with 5 annular grooves, with the spacing between the centres of two neighbouring grooves being 4 mm.

Figure 7:
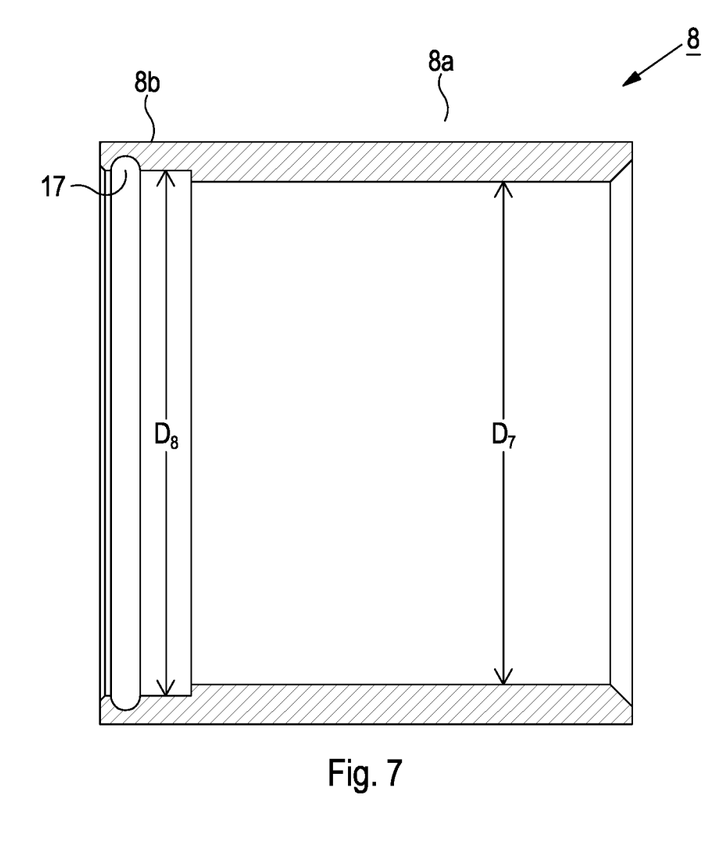
FIG. 7 is an enlarged sectional view of a cap of the energy-absorbing structure of FIG. 1, 2 or 3.

FIG. 7 is a schematic sectional view of the cap 8 of the embodiment of FIGS. 1 and 2. The cap has a portion 8a with a first internal diameter $D_7$ and a second portion 8b with an internal diameter $D_8$ where $D_8 \geq D_7$. The diameters $D_7$ and $D_8$ are chosen such that $D_8 > D_5 > D_7$, where $D_5$ is the diameter of the "washer portion" 10a of the plug 6, so that the washer portion 10a of the plug is received in the larger diameter portion 8b of the cap and abuts against the step formed where the internal diameter of the cap changes from $D_7$ to $D_8$. In a preferred embodiment $D_5$ and $D_8$ may be chosen such that the cap is an interference fit onto the plug, although the invention does not require this.

The internal diameter $D_7$ of the smaller diameter portion of the cap is chosen to be very slightly larger than the external diameter of the spring once it has been screwed onto the plug 6, as shown in FIG. 2. The cap 8 serves to prevent the spring from being pulled off the thread when the tether device is used.

In the embodiment of FIG. 7 the larger diameter portion 8b of the cap may be provided with one or more recesses 17, for example an annular groove, on its internal surface for receiving a clip or clips 23 that retain(s) the cap on the plug 6.

The components of the tether line may be made from any material that has the required strength and that is sufficiently corrosion-resistant for the environmental conditions in which it will be used. In one example the cap and plug are made of stainless steel, for example by casting, machining or by 3-D printing. The spring may also be made of stainless steel wire, for example by being cold wound and then annealed to restore its mechanical properties. The invention is not however limited to this and other materials may be used. In other examples the cap and plug may be made from other materials such as, for example, other metals, composite materials, ceramics or plastics. The support cable sections may conveniently be of wire rope of a suitable diameter for the intended loading of the tether line.

Figure 3:
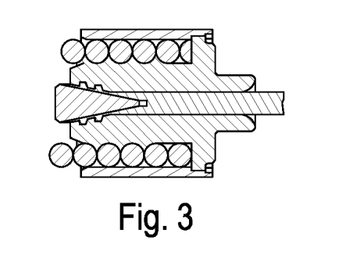
FIG. 3 is a partial sectional view of an energy-absorbing structure according to a modified embodiment.

It will be understood from the description of the tether line that its assembly is straightforward. Initially, each support cable section 2,3 is inserted into the bore of a respective plug, and is secured in position by driving a wedge 7 into the end of the support cable. To facilitate this, the outer end face of the wedge portion is preferably wholly or partially flat, to enable to wedge to be driven into the support cable for example using a hammer. An alternative wedge 7' in which the outer end face of the wedge is flat over substantially all of its area is shown in FIG. 3. An adhesive is then applied to secure the wedge and the support cable section to the plug.

The spring 5 may then be screwed into position on one of the plugs, and a cap placed in position over that plug. A second cap is then disposed over the spring, the second end of the spring is screwed into the second plug, and the second cap is then moved into position over that plug and secured if necessary. The caps may be secured to their respective plugs for example using an adhesive; alternatively, as noted, they may be made to be an interference fit to the plugs. In a yet further embodiment the cap is additionally or alternatively secured to the plug using a locking pin that is inserted through a hole in the cap and into a corresponding hole in the plug.

Figure 8A:
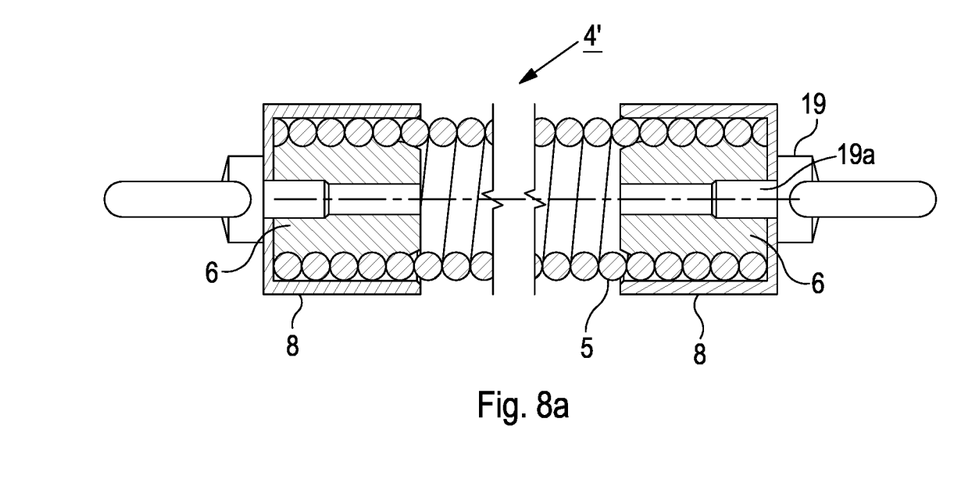
FIGS. 8(a) and 8(b) are a sectional view and a perspective view of an energy-absorbing structure according to another embodiment of the invention.
Figure 8B:
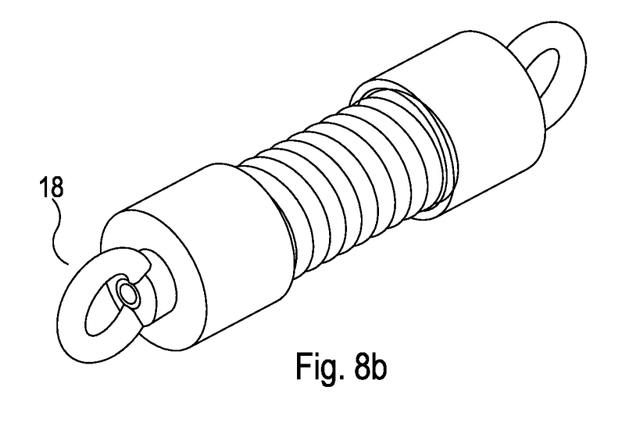

Securing a support cable section to the connector using a wedge 7 as described above provides an inexpensive yet reliable attachment of the support cable section to the connector. Furthermore, the wedge is internal to the energy-absorbing structure so making the energy-absorbing structure compact. However, it will be understood that the invention has been described above with reference to one example, and that many variations can be contemplated. Moreover, in the above embodiment the connectors 6, 6' secure an end of the spring to a fastener comprising a support cable section but the invention is not limited to this. As an example, FIGS. 8(a) and 8(b) show an energy-absorbing structure 4' for a tether line according to another embodiment of the invention. As with the previous embodiment the energy-absorbing structure 4' comprises a spring 5 secured at each end to a respective plug 6. However, rather than the support cable sections 2,3 being secured directly to the plugs 6 as in FIG. 2, in FIG. 8(a) each plug 6 secures an end of the helical spring to a fastener comprising an eye bolt or eye nut (in this example an eye bolt 18) to which the support cable section 2,3 (not shown in FIGS. 8(a) or 8(b) may be joined). The eye bolt may be joined to the plug in any suitable way, for example each eye bolt may have a base 19 with an externally-threaded portion 19a that screws into the bore 9 of the plug. Conveniently the cap 8 is held between the eye bolt 18 and the plug 6, so that the action of screwing the eye bolt into the plug also serves to fasten the cap 8 over the plug.

Figure 9A:
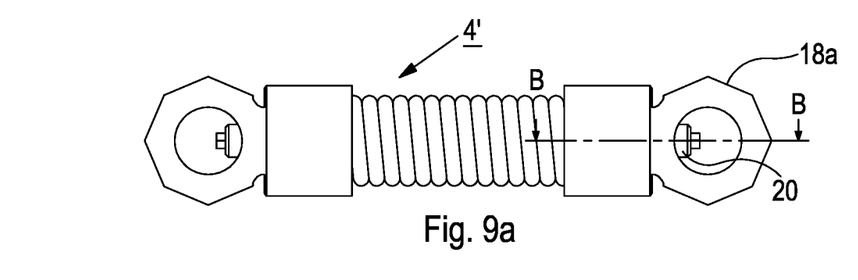
FIGS. 9(a) to 9(c) are schematic views of energy-absorbing structures according to further embodiments of the invention.

Other examples of ways in which an eye bolt or eye nut may be secured to the plug are shown in FIGS. 9(a) and

Figure 9B:
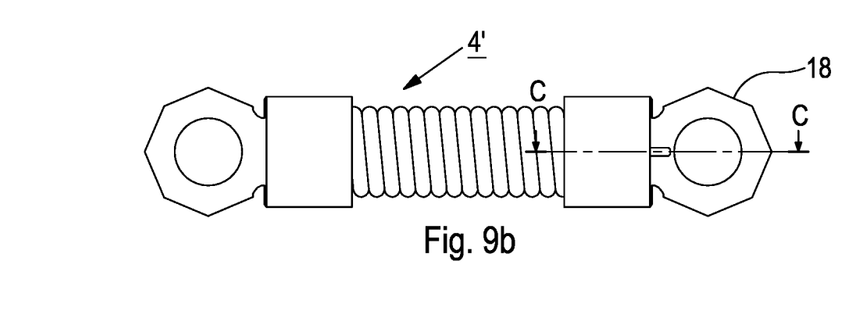
Figure 9C:
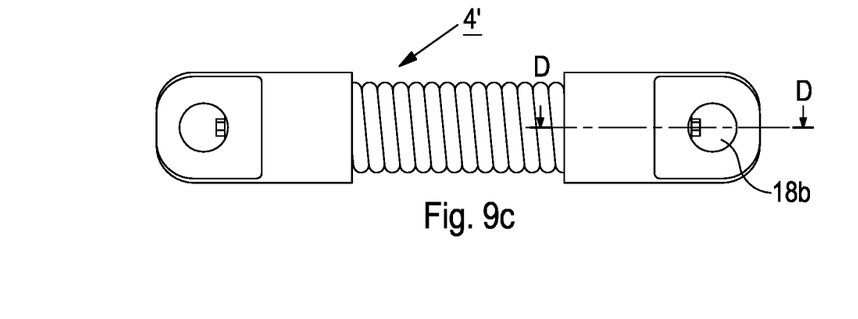
Figure 10A:
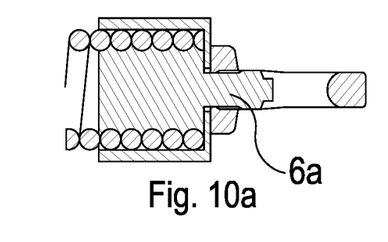
FIGS. 10(a) to 10(c) are cross-sectional views through the connectors shown in FIGS. 9(a) to 9(c) respectively.
Figure 10B:
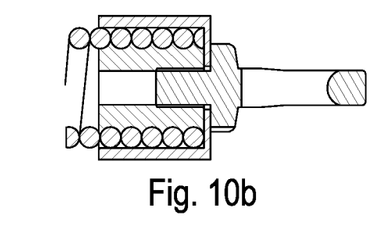
Figure 10C:
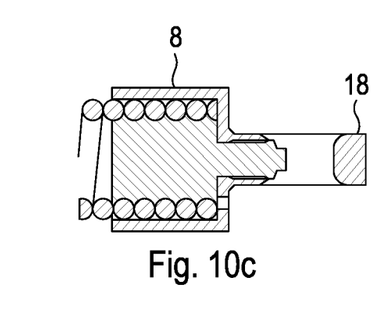

10(*a*) (eye nut), in FIGS. 9(*b*) and 10(*b*) (eye bolt), and in FIGS. 9(*c*) and 10(*c*) (integrated cap with connection eye). FIG. 10(*a*) is a partial cross-sectional view through the energy-absorbing structure 4' of FIG. 9(*a*), and so on. In FIGS. 9(*a*) and 10(*a*), the plug 6 is provided with a protruding externally threaded stem 6*a* that passes through a complementary threaded bore in an eye nut 18*a* to allow the eye nut 18*a* to be screwed onto the stem 6*a* of the plug. The eye nut may be retained on the stem 6*a* in any suitable manner, for example using an adhesive, a split pin through the stem, and/or or a locking nut 20.

In FIGS. 9(*b*) and 10(*b*), an eye bolt 18 is screwed into the bore of the connector, in the general manner described above with reference to FIGS. 8(*a*) and 8(*b*).

In FIGS. 9(*c*) and 10(*c*) an eye 18*b* is formed integrally in the cap 8, and the cap also functions as an eye nut. The combined cap/eye nut has a threaded bore to allow the combined cap/eye nut to be screwed onto a threaded stem 6*a* of the connector as described for FIGS. 9(*a*) and 10(*a*); the combined cap/eye nut may be secured as described for FIGS. 9(*a*) and 10(*a*).

Figure 11A:
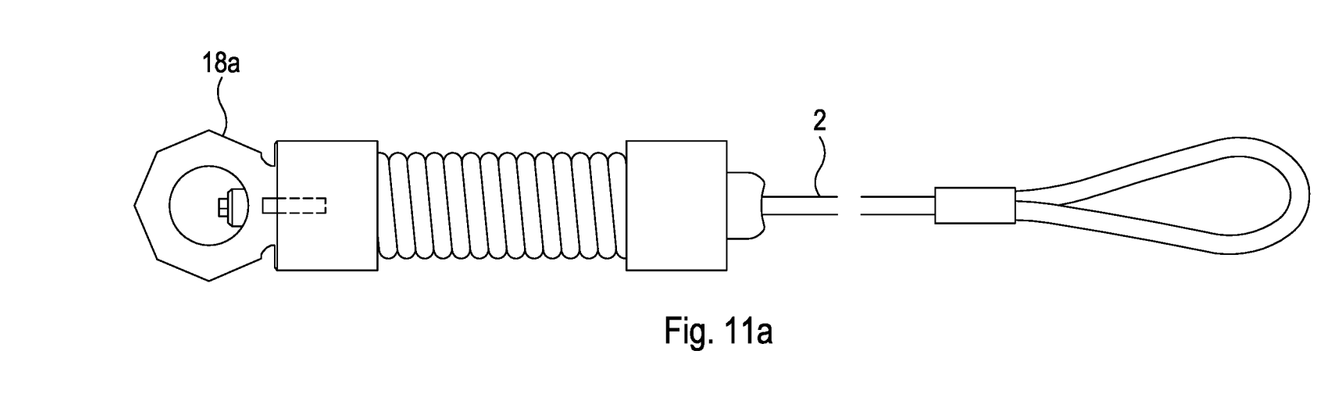
FIGS. 11(a) and 11(b) are schematic views of an energy-absorbing structure according to a further embodiment of the invention.
Figure 11B:
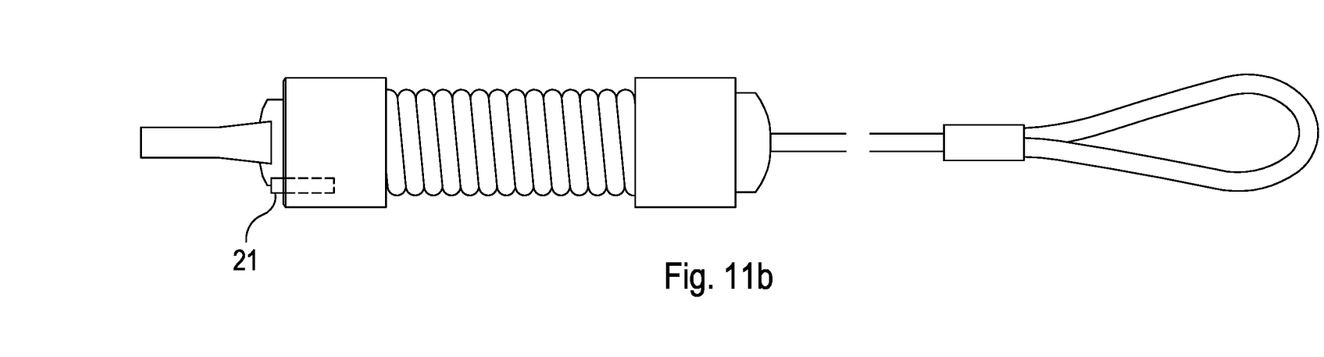

Examples of suitable eye bolts or eye nuts for use in the present invention includes those manufactured by the Rud Group. More details are available at: http://www.rud.com/en/products/sling-lashing-systems/sling-systems/lifting-points/detail/rs-eye-bolt-metric-fine-thread.html and at: http://www.rud.com/en/products/sling-lashing-systems/sling-systems/lifting-points/detail/rm-eye-nut-metric-fine-thread.html The invention does not require that the cap and plug at one end of the spring (or other energy-absorbing component) are the same as the cap and the plug at the other end. As an example, FIG. 11 shows an embodiment in which a support cable section 2 is secured to one plug using a wedge as described with reference to FIG. 2, and in which an eye nut or eye bolt (in this particular example an eye nut 18*a*) is provided on the other plug. FIG. 11 shows an eye nut provided as described with reference to FIGS. 9(*a*) and 10(*a*), but the eye nut or eye bolt may be provided in other ways. In further embodiments (not illustrated) an eye nut/eye bolt may be provided in one way at one end of the spring and another eye nut/eye bolt may be provided in a different way at the other end of the spring.

FIG. 11 illustrates a further feature that may be used in the invention. A hole for a safety/locking pin may be drilled, after assembly is complete, through the cap 8 and into the flat face of the plug. The locking pin 21 shall preferably extend outside the cap so as to be visible for inspection. The locking pin prevents the eye bolt/nut from being unscrewed or otherwise unfastened. The eye nut/eye bolt has a recess/slot that receives the pin. The hole extends as far as is necessary into the plug to provide a secure fastening, for example the depth of the hole may cover two helical sections of the spring. The pin may be a force-fit in the hole, or the pin may be secured in place in the hole, for example using an adhesive.

Where a locking pin is provided, the locking pin may additionally or alternatively prevent the spring 5 from rotating relative to the connector 6. This is illustrated in FIGS. 12 and 13(*a*)-13(*c*).

Figure 12:
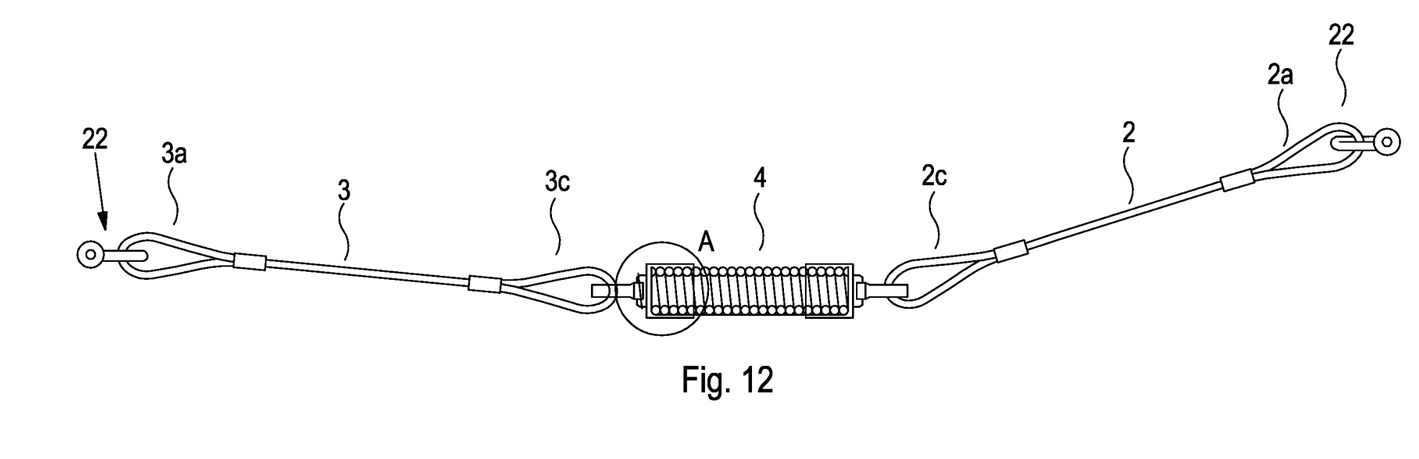
FIG. 12 is a schematic view of a tether line incorporating an energy-absorbing structure of the invention.
Figure 13A:
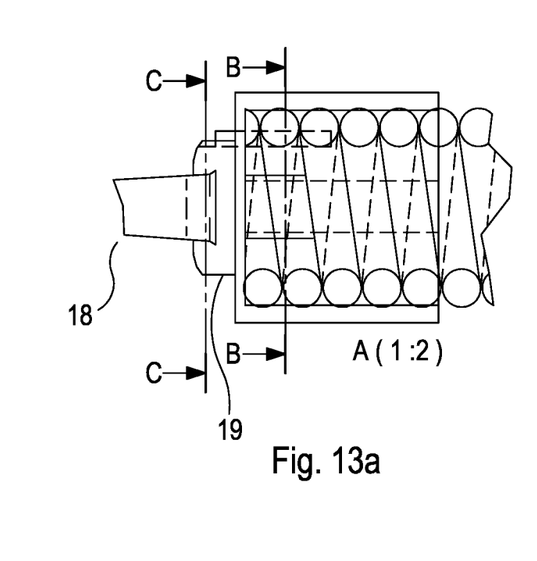
FIGS. 13(a) to 13(c) are a partial enlarged view and sectional views of the energy-absorbing structure shown in FIG. 12.
Figure 13B:
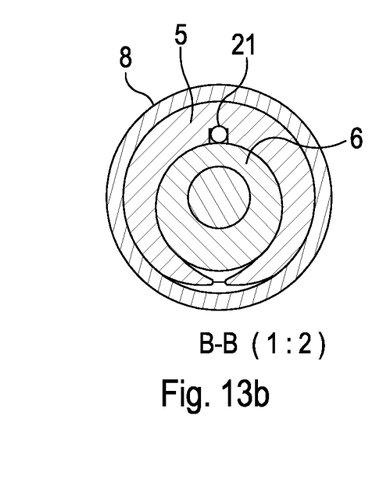
Figure 13C:
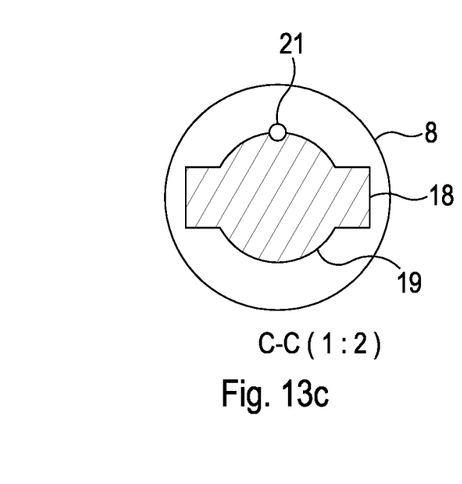

FIG. 12 is a general view of a tether line or fall arrest line incorporating an energy-absorbing structure 4 according to the present invention. The energy-absorbing structure 4 is connected to two support cable sections 2, 3, each of which is provided with a looped end section 2*a*, 3*a* at their distal ends for connection to a support structure or an object/person to be secured, for example using a lifting shackle 22.

In this example the support cable sections are each connected to the energy-absorbing structure 4 via an eye bolt 18—the support cable sections are provided with a looped end portion 2*c*, 3*c*, at their inner ends that passes through the eye of the eye bolt.

As noted, in other embodiments one or both support cable sections 2, 3 may alternatively be connected directly to the respective connector 6, for example as described with reference to FIG. 2.

In further embodiments, one of the support cable sections may be omitted and one of the shackles 22 may be connected directly to the energy-absorbing structure, for example via an eye bolt/eye nut attached to a connector of the energy-absorbing structure.

FIG. 13(*a*) is an enlarged view of the portion of FIG. 12 in the circle A, and FIGS. 13(*b*) and 13(*c*) are sectional views through the end cap and connector of FIG. 13(*a*) along the lines B-B and C-C respectively. In this example the locking pin 21 extends along the axis of the connector 5, but is offset from the axis of the connector. As indicated in FIG. 13(*c*) the locking pin passes through a recess (or alternatively a bore) in the base 19 of the eye bolt, through a hole in the cap 8, and into the connector, thereby securing against rotation of the eye bolt and/or cap relative to the connector.

Additionally or alternatively a complementary recess is provided in the first few turns of the spring 5, as indicated in FIG. 13(*b*). The locking pin 21 passes through this recess, and thereby secures against rotation of the spring relative to the connector.

Although this is not illustrated, a locking pin may also be provided in the embodiments of FIG. 2 or 3. A complementary recess may be provided in the first few turns of the spring 5, in a similar manner to that shown in FIG. 13(*b*), and a locking pin may be inserted into the connector 6 to pass through this recess and secure against rotation of the spring relative to the connector.

In the embodiments the cap or sleeve 8 extends over all the threaded portion of the connector. In principle however the cap/sleeve may be of different lengths and could be made shorter or longer than shown in the figures (provided that, if the sleeve were made shorter than shown in the figures, it still covered enough turns of the helical spring to retain the spring securely on the connector).

The invention claimed is:

1. An energy-absorbing structure for a tether line, comprising:
   a helical spring;
   a connector having an externally threaded portion for threadedly receiving a first end of the helical spring;
   a fastener to which the connector secures the first end of the helical spring, wherein the fastener has a ring-shaped or looped end;
   a sleeve provided on the connector and extending over at least part of the first end of the helical spring and the externally threaded portion of the connector, the sleeve being configured to retain the helical spring on the connector.

2. The energy-absorbing structure as claimed in claim 1, wherein the connector further comprises a tapered portion extending from the inner end of the externally threaded portion.

3. The energy-absorbing structure as claimed claim 1, wherein the connector is adapted to be secured to a support cable portion.

4. The energy-absorbing structure as claimed in claim 3, wherein the connector comprises an axial bore for receiving the support cable portion.

5. The energy-absorbing structure as claimed in claim 4, and further comprising an insert member for retaining the support cable portion in the bore.

6. The energy-absorbing structure as claimed in claim 5, wherein the bore comprises a tapered portion at the inner end of the connector, the tapered portion of the bore increasing in diameter towards the inner end of the connector, and wherein the insert member comprises a tapered portion adapted to be received in the tapered portion of the bore.

7. The energy-absorbing structure as claimed in claim 6, wherein the taper angle of the tapered portion of the bore is less than the taper angle of the tapered portion of the insert member.

8. The energy-absorbing structure as claimed in claim 1, wherein the connector comprises a threaded stem for connection to an eye nut.

9. The energy-absorbing structure as claimed in claim 8, and further comprising second locking means configured to prevent relative rotation between the eye bolt or eye nut and the connector.

10. The energy-absorbing structure as claimed in claim 8, further comprising locking means configured to prevent relative rotation between the helical spring and the connector.

11. The energy-absorbing structure as claimed in claim 1, wherein the connector comprises a threaded axial bore for receiving an eye bolt.

12. The energy-absorbing structure as claimed in claim 1, and further comprising first locking means configured to prevent relative rotation between the helical spring and the connector.

13. An energy-absorbing structure for a tether line, comprising:
 a helical spring; and
 a connector for securing a first end of the helical spring to a first fastener, the connector having an externally threaded portion for threadedly receiving the first end of the helical spring,
 wherein the connector further comprises a tapered portion extending from the inner end of the externally threaded portion.

14. The energy-absorbing structure as claimed in claim 13, further comprising a sleeve provided on the connector and extending over at least part of the first end of the helical spring and the external threaded portion of the connector, the sleeve being configured to retain the helical spring on the connector.

15. A tether line comprising an energy-absorbing structure, the energy absorbing structure comprising:
 a helical spring;
 a connector having an externally threaded portion for threadedly receiving the first end of the helical spring; and
 a sleeve provided on the connector and extending over at least part of the first end of the helical spring and the external threaded portion of the connector, the sleeve being configured to retain the helical spring on the connector.

16. A fall arrest line comprising an energy-absorbing structure, the energy absorbing structure comprising:
 a helical spring;
 a connector having an externally threaded portion for threadedly receiving the first end of the helical spring; and
 a sleeve provided on the connector and extending over at least part of the first end of the helical spring and the external threaded portion of the connector for retaining the helical spring on the connector.

* * * * *